(12) United States Patent
Guichard et al.

(10) Patent No.: US 7,688,829 B2
(45) Date of Patent: Mar. 30, 2010

(54) SYSTEM AND METHODS FOR NETWORK SEGMENTATION

(75) Inventors: James N. Guichard, Groton, MA (US); W. Scott Wainner, Potomac Falls, VA (US); Saul Adler, West Hempstead, NY (US); Khalil A. Jabr, Austin, TX (US); S. Scott Van de Houten, Geneva, FL (US)

(73) Assignee: Cisco Technology, Inc., San Jose, CA (US)

( * ) Notice: Subject to any disclaimer, the term of this patent is extended or adjusted under 35 U.S.C. 154(b) by 1058 days.

(21) Appl. No.: 11/226,011

(22) Filed: Sep. 14, 2005

(65) Prior Publication Data

US 2007/0058638 A1  Mar. 15, 2007

(51) Int. Cl.
*H04L 12/28* (2006.01)
(52) U.S. Cl. .................................. 370/395.31; 370/396
(58) Field of Classification Search ........................ None
See application file for complete search history.

(56) References Cited

U.S. PATENT DOCUMENTS

| | | | | |
|---|---|---|---|---|
| 7,489,681 B1* | 2/2009 | Aggarwal et al. | ........... | 370/389 |
| 2001/0050914 A1* | 12/2001 | Akahane et al. | ............. | 370/382 |
| 2003/0177221 A1* | 9/2003 | Ould-Brahim et al. | ...... | 709/223 |
| 2004/0078469 A1* | 4/2004 | Ishwar et al. | ................. | 709/227 |
| 2004/0174879 A1* | 9/2004 | Basso et al. | .................. | 370/392 |
| 2005/0091482 A1* | 4/2005 | Gray et al. | ................... | 713/151 |
| 2005/0111445 A1* | 5/2005 | Wybenga et al. | ............ | 370/389 |
| 2005/0120089 A1* | 6/2005 | Kang et al. | .................. | 709/213 |
| 2005/0188106 A1* | 8/2005 | Pirbhai et al. | ............... | 709/238 |
| 2005/0220014 A1* | 10/2005 | DelRegno et al. | ........... | 370/230 |
| 2006/0133265 A1* | 6/2006 | Lee | ............................. | 370/228 |
| 2006/0182037 A1* | 8/2006 | Chen et al. | ................... | 370/252 |

* cited by examiner

*Primary Examiner*—Hong Cho
*Assistant Examiner*—Eunsook Choi
(74) *Attorney, Agent, or Firm*—Brinks Hofer Gilson & Lione

(57) ABSTRACT

A routing mechanism provides network segmentation preservation by route distribution with segment identification, policy distribution for a given VPN segment, and encapsulation/decapsulation for each segment using an Ethernet VLAN_ID, indicative of the VPN segment (subnetwork). Encapsulated segmentation information in a message packet identifies which routing and forwarding table is employed for the next hop. A common routing instance receives the message packets from the common interface, and indexes a corresponding VRF table from the VLAN ID, or segment identifier, indicative of the subnetwork (e.g. segment). In this manner, the routing instance receives the incoming message packet, decapsulates the VLAN ID in the incoming message packet, and indexes the corresponding VRF and policy ID from the VLAN ID, therefore employing a common routing instance over a common subinterface for a plurality of segments (subnetworks) coupled to a particular forwarding device (e.g. VPN router).

23 Claims, 6 Drawing Sheets

SYSTEM AND METHODS FOR NETWORK SEGMENTATION

BACKGROUND

In a typical campus network environment, a set of related local area networks (LANs) are often co-located in a common geographic area. In such a campus environment, each of the LANs, or subnetworks, may define single or multiple groups of users interconnected in a switched Ethernet framework. Campus LANs at different locations within an organization are typically interconnected via an Enterprise WAN or Service Provider network. Virtual Private Networks (VPNs) have traditionally been used by Service Providers to isolate different customers from each other over their networks. ATM and Frame Relay mechanisms provide Layer 2 VPN traffic isolation, where as IPSec and MPLS typically provide L3 VPN traffic isolation between customers. The need for traffic isolation or segmentation within Campus networks is increasing because of both additional security requirements and because more Enterprise organizations are acting as Service Providers for their departments, guests, subsidiaries, etc. Many enterprises wish to run multiple logically isolated networks within the same campus or data center environment. This is typically achieved through the use of layer 2 Virtual LAN (VLAN) technology where groups of devices and users are assigned to VLANs represented by a given VLAN Identifier (VLAN ID) in the Ethernet frame. The use of VLAN technology to create many, parallel, network-wide segments becomes cumbersome, unreliable, and prone to configuration error. The scope of VLAN segmentation is usually bounded to a site, building, or section of a building to isolate layer 2 traffic, broadcast domains, and spanning tree domains. Historically, an enterprise has turned to Layer 3 (L3) routing (e.g. routing based on IP addresses) to interconnect VLANs and used L3 and L4 filters or access control lists to provide traffic separation and isolation. As the enterprise began to distribute IP services such as Voice-Over-IP (VoIP) end-points, additional security controls, guest VLANs, and quarantine VLANs through out the campus and data center, the use of traffic filtering technology made traffic isolation between the user VLANs more complicated.

Specifically, the use of Layer 3 (L3) access control lists (e.g. IP address filtering) between the VLANs made management and security much more cumbersome. The net effect is the trend towards implementation of L3 VPN methods deeper into the campus and data center. The L3 VPN methods in use today require VLANs to be assigned to VPNs, a unique routing process per VPN, and some form of tunneling technology (GRE, IPSec, MPLS) to be used to provide traffic separation between VPNs across the network. The multiple instances of Interior Gateway Protocol (IGP) processes, Border Gateway Protocol (BGP) processes, tunnel adjacencies, and/or MPLS adds significant complexity to the implementation of traffic segmentation across a switched campus infrastructure.

Some enterprises have implemented Multi-VRF technology with VLAN segmentation as a means of providing the VPN services in lieu of MPLS. This solution requires multiple sub-interfaces and multiple routing instances (e.g. routing processes) to correspond to each of the virtual route forwarding tables defined for each of the VPNs. Establishing multiple sub-interfaces and routing instances (one per VPN) invokes substantial computing overhead and multiplies the provisioning complexity. The individual routing instances maintain the virtual route forwarding table (VRF) and routing policy for each VPN. The individual VRFs are accessed through conventional sub-interfaces upon which traffic is received and forwarded. In other words, each VPN partition providing traffic segmentation requires a unique routing instance, a set of distinct sub-interfaces, and an associated routing policy. In other words, each conventional VPN sub-network triggers another IGP routing instance. A more efficient network segmentation model is required that simplifies the provisioning and optimizes the computational requirements.

SUMMARY

Configurations described above are deployed, in part, based on the observation that conventional Service Provider VPN methods are too complex and cumbersome for most Enterprise campus infrastructures. Accordingly, the methods and procedures described in this invention overcome the shortcomings of existing conventions by providing a simplified method upon which VPN traffic is forwarded. VPN identification information is used to encapsulate each packet and identifies which virtual route forwarding table is used to make a forwarding decision. This VPN identification may be encoded as an Ethernet Virtual Local Area Network ID (VLAN ID) on Ethernet trunks between VRF-aware devices. In contrast to conventional Ethernet mechanisms, configurations herein encapsulate using the VLAN ID to denote the VRF instance used for forwarding based on association tables that correlate VLAN ID's to VRF's rather than employing the conventional sub-interface assignment to VRF as an indicator. The sender encapsulates using a VLAN identifier, or other advertised segmentation identifier, indicative of a particular virtual route forwarding table (VRF) associated with the VPN at the receiver. Therefore, arrangements discussed below disclose a simplified method of dynamically building the association of VLAN-IDs to VRFs by providing routing and network segmentation within the campus and data center environment.

In the exemplary configuration, the advantages disclosed herein are particularly apparent in a so-called campus environment. A campus environment employs switched Ethernet interconnections between routing devices, i.e. devices enabled to perform forwarding decisions based on path and destination information in the packet. Certain routing and switching mechanisms, such as Label Switch Path (LSP) routing and IPSec, may tend to interfere with conventional campus utilities such as firewalls, caching, etc, and thus lends itself more suitable to core network infrastructures such as those used by service providers. Accordingly, configurations herein apply L3 routing information at intermediate hops by inspecting L2 framing information for VPN-IDs, get VRF L3 forwarding info associated with the VPN-ID, and subsequently encapsulate for the next L2 hop. Therefore, switching in such a manner uses a single interface between L3 hops. Routers employing this mechanism advertise the VPN ID that corresponds to the advertiser's VRF, thus identifying the advertiser as operable to receive and interpret a packet tagged with the corresponding VLAN ID associated with the VPN-ID, and map it to the correspond VRF table.

A L3 routing entity's common routing instance receives the routing update message via a common interface from a peer and binds the advertised VPN-ID associated with a VLAN-ID to the corresponding VRF table. In this manner, the routing instance correlates a VRF routing decision with a VLAN ID tag used for encapsulation. The L3 routing entity encapsulates VRF forwarded packets with the associated VLAN ID tag and transmits the tagged packet over the common interface to the peer. The L3 routing entity's peer routing process receives the incoming tagged packet on the common interface, decapsulates (inverse of encapsulation) the VLAN ID in the incoming message packet, indexes the corresponding VRF based on the association of the VLAN ID tag to the VRF, therefore employing a common routing instance over a common interface for a plurality of VPNs coupled to a particular forwarding device (e.g. VPN router).

Employing the VLAN-ID or other suitable L2 segment identifier, the method encapsulates layer 3 VPN information in a layer 2 frame for upper layer protocols (such as layer 3 routing protocols) to base forwarding decisions on. As the packet is routed in layer 3, when it reaches a device that need to again use layer 2 VLAN segmentation, the VLAN identifier is placed in the VLAN-ID field of the Ethernet frame. In this way, layer 3 traffic segmentation is retained over campus network devices with layer 3 forwarding and through devices that only support layer 2 segmentation. In configurations discussed herein, the disclosed system allows layer 2 segments, such as VLANs that exist within a campus network, to be mapped or associated with (propagated via) layer 3 VPNs, over devices which do not support layer 3 segmentation (e.g. VRFs). Layer 3 routing will be used to provide connectivity between VLANs in the same VPN. Traffic between L3 routing entities employ configurations that use one global interface to carry segmentation between networks. Included aspects of the system are 1: the propagation/auto discovery portion, 2: The encapsulation/decapsulation mechanism (ENCAP/DECAP) model that either uses a known algorithm, or uses a control plane to dynamically discover and perform encapsulation/decapsulation, and 3: A policy model that can be used to specify policy or other information to control items 1 and 2 above.

Advantages of this approach therefore include employing a common IGP routing process and shared interface between adjacent Layer 3 Routing Entities (L3REs) to enable VPN segmentation. The VPN segmentation is preserved in the L3REs through VRF tables while it is preserved between the L3RE and through Layer 2 Switching Entities (L2SE) through VLAN segmentation. The use of the VPN ID in the IEEE 802.1q VLAN ID field (i.e. Ethernet VLAN framing) between L3RE allows traditional L2SE to maintain the VPN segment through basic VLAN forwarding. The Ethernet VLAN framing also allows many of the traditional enterprise tools such as Intrusion Prevention/Detection, Sniffer, Firewall, and Encryption to continue to function while maintaining the VPN segmentation. The common IGP process with VPN segment identification and shared interface with VPN-ID encapsulation/decapsulation allows a scalable deployment model throughout the campus.

In further detail, the method of forwarding packets according to a network segmentation mechanism includes first advertising, to adjacent routers, an ability to receive via the common interface and to recognize and map encapsulated segmentation information according to the method defined herein. Individual forwarding entities (i.e. routers) advertise the segment identifier corresponding to the indexed forwarding table for the VRF served by that router, such that the advertisement includes a routing prefix corresponding to the indexed forwarding table (i.e. the VRF table).

Subsequently, the recipient/forwarding router receives a message packet for forwarding, in which the message packet is received on the common interface adapted to interpret encapsulated VPN information for a plurality of network segments, and decodes the received message packet to identify the segmentation information. Based on the decapsulated segmentation information (e.g. VLAN ID), the router selectively indexes a particular forwarding table corresponding to the segmentation information, and forwards the message packet based on the indexed forwarding table, in which the forwarding table corresponds to the particular network VPN segment intended as the message packet destination.

In the exemplary arrangement, selective indexing into the forwarding table is performed by a routing instance operable to index a plurality of forwarding tables, each of the forwarding tables corresponding to a particular VPN, thus avoiding a multiplicity of routing instances. For typical transactions, receiving the message packet further includes receiving a plurality of message packets on the common interface, such that each of the message packets corresponds to a predetermined one of a plurality of forwarding tables, in which the forwarding tables correspond to a segment identifier in the encapsulating header of the message packet. Therefore, the router receives a plurality of message packets corresponding to a plurality of respective routing tables via the common interface and operable to be routed by the common routing instance.

Each of the received message packets is responsive to encapsulation of the segmentation information at a sender of the message packet, in which the encapsulation is further responsive to the advertised VPN identifier, such as the VLAN ID, previously received by (advertised to) the sender. The routing instance is operable to forward the packet such that a separate routing policy is applicable to each of the packets forwarded by the routing instance, allowing each VRF to maintain an independent routing policy. In the exemplary configuration, the segmentation information is a VLAN ID deterministic of a particular VRF having routing information for a predetermined VPN segment. The resulting decoding to identify the segmentation information further comprises a layer 2 switching operation and the selective indexing further comprises a lookup in a layer 3 virtual routing and forwarding table.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method or operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the VPN segmentation techniques explained herein as embodiments of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
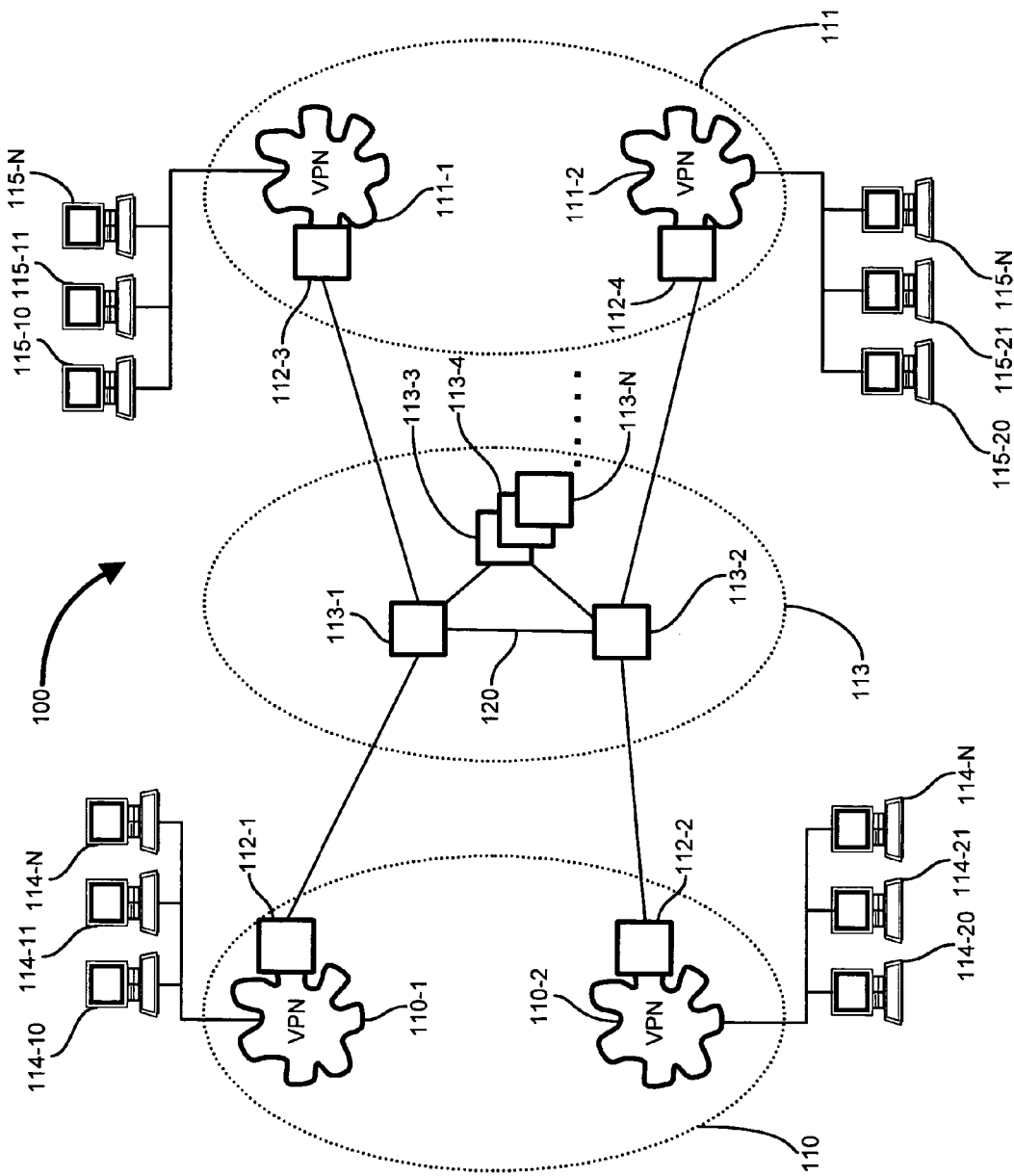
FIG. 1 is a context diagram of a campus environment including interconnected nodes serving a network of VPNs suitable for use with the invention.

Configurations of the invention provide preservation of VPN segmentation information by encapsulating using a segmentation identifier, such as an Ethernet VLAN ID, indicative of a VPN having a virtual routing and forwarding table (VRF) in a L3 routing entity, and providing a common interface on which incoming traffic is received for forwarding based on the VLAN-indexed VRF. Encapsulated segmentation information in each message packet identifies which routing and forwarding table is employed for the next hop. Typically, the segmentation information is in the form of a Virtual Local Area Network ID (VLAN ID) indicative of the particular VPN subnetwork. In contrast to conventional mechanisms, configurations herein encapsulate using the VLAN ID to denote the VRF rather than employing the subinterface as an indicator. The sender encodes the VLAN identifier, or other advertised segmentation information, indicative of the particular virtual routing and forwarding table (VRF) applicable to the VPN to which the packet is directed. Segmentation is achieved because the VLAN ID is specific to the VRF corresponding to the VPN of the intended receiver. In contrast, conventional mechanisms employ a plurality of interfaces to each correspond to a routing table of a plurality of available routing tables. Conventional incoming traffic is therefore matched to a particular routing table, such as a VRF table corresponding to a VPN segment, by identifying the conventional incoming interface.

Configurations disclosed herein, therefore, provide a scalable method of L3 routing, policy distribution, and data forwarding for a set of network segments where each network segment is referred to a VPN. A VPN may be defined as the coupling of Ethernet VLAN segments and Virtual Route Forwarding tables such that the partitioning of network segments is maintained through L2 switching entities (L2SE) and L3 routing entities (L3RE). A method is defined for distributing L3 IP routing information via an IGP such that each of the VPNs L3 route tables remains distinct at each L3RE. Route distribution includes advertising L3 routes corresponding to a particular VRF to adjacent L3 device, and employing the VLAN IDs to selectively encapsulate addresses corresponding to particular VPN subnetworks. Exemplary arrangements also associate policy information with the L3 route entries such that data forwarding methods may be selected accordingly. Further, configurations herein define transmission across the L2 segmented medium such that the VPN segmentation is preserved. In order to achieve such network segmentation preservation, the following functions are provided: route distribution with VPN segment identification, policy distribution for a given VPN segment, and encapsulation/decapsulation for each VPN segment using the Ethernet IEEE 802.1qVLAN_ID field.

The method for distributing each VPN segment's L3 IP routing information relies upon a common IGP process between two or more L3RE. The routing prefixes for a given VPN segment are uniquely identified at each L3RE by associating a VPN segment identifier (VPN-ID). The VPN-ID is used by IGP peers to determine the VPN segment to which the prefix belongs and the encapsulation method to maintain the segmentation through a L2SE. The L2 segmentation identifier, such as VLAN ID, may be statically configured as the VPN-ID to associate to each L3 routing entity's VRF. Routing prefixes propagated between the L3RE may use the VPN identifier to associate the prefixes with the correct VRF. Alternatively, the L3RE may propagate a route prefix with a VPN-ID index value (similar to a route distinguisher in MPLS VPN networks) that is associated with the VPN's appropriate VRF and the L2 segment identifier (VLAN_ID). The segment index value's association with the VPN-ID and VLAN-ID may be statically configured at each L3RE or propagated via a protocol including the IGP, VTP, or equivalent.

A method is further defined for associating a policy with each VPN segment's route prefixes. The policy attributes may include QoS attributes for the VPN segment (bandwidth, priority), security criteria (group association), etc. The policy attributes may be distributed as aggregated attributes associated with the VPN segment, aggregated attributes for a set of route prefixes within the VPN segment, or individual route prefixes within the VPN segment. A method is defined for encapsulation and decapsulation of VPN segments at the L3RE. The L3RE that receives the set of advertised routes must determine which VPN segment to which the prefix belongs and the forwarding attributes associated with the prefix including the L2 segment identifier (i.e. VLAN_ID). The L3RE binds the L2 segment identifier with the appropriate VRF forwarding table entries having the adjacent L3RE as the next-hop. The policy determines the QOS attributes applied to the forwarded traffic associated with the VPN segment and the security policy for the VPN segment. In a campus environment network, the segment identifier and VPN ID is placed in the 802.1q VLAN ID field to mark each Ethernet frame with it's associated VRF. The VRF identifies the VLAN_ID used for 802.1q encapsulation of forwarded traffic. The L3RE that receives frames transmitted from an adjacent L3RE will use the L2 segment identifier (i.e. VLAN_ID) to identify which of the VRF tables to be used for L3 route lookup. It should be noted, therefore, that the L3RE can use a shared or dedicated (point-to-point) interface for routing adjacency, encapsulation, and decapsulation of VPN segments.

FIG. 1 is a context diagram of an exemplary a campus environment 100 serving a plurality of users 114-1 . . . 114-N (114 generally) and 1 . . . 115-N (115 generally) from an interconnection 120 of nodes 113-1 . . . 113-N (e.g. VRF routers) suitable for use with the invention. Referring to FIG. 1, the exemplary campus VPN environment 100 includes a plurality of VPNs 110 with subnetworks 110-1 . . . 110-2 and 111 with subnetworks 111-1 . . . 111-2, each serving a set of end users 114 and 115, respectively. In the exemplary configuration, subnet 110-1, serving users 114-1n is disjoint from subnet 110-2, serving users 114-2n, by routers in group 113, having routers configured according to principles of the invention. Similarly, subnet 111-1, serving users 115-1n, is disjoint from subnet 111-2, serving users 115-2n, also by routers 113. Accordingly, in this case, the 114-xx users belong to VPN 110 and the 115-xx users belong to VPN 111. Thus, the environment 100 illustrates that the VPNs are segmented by discrete interfaces on 113-1 and 113-2 when connecting to 112-1, 112-2, 112-3, and 112-4. Likewise, a common interface exists between 113-1 and 113-2 where the VPN segmentation is applied. Other devices operable for VRF operation as disclosed herein are shown as 113-N (e.g. other VRF routers). The routers 113 define the interconnection 120 forming a switched Ethernet environment supporting the various VPNs 110 and 111 in the campus 100. Each of the VPNs is typically a LAN serving a particular department, building, or set of logically related users, as appropriate, such as the exemplary user groups 114-1n and 114-2n, of subnetworks 110-1 and 110-2, respectively, and user groups 115-1n and 115-2n, of subnetworks 111-1 and 111-2, respectively. The interconnected routers 113 thus support the interconnection 120 providing a common transmission medium for both VPNs 110 and 111. One or more of the routers 113 in the interconnection 120 typically employs a connection to a service provider network or other public access network such as the Internet (not specifically shown) for communications external to the campus environment. However, within the campus environment 100 the routers 113 are operable for VLAN indexed communication based on the VLAN ID as discussed further below.

In the exemplary configuration, the VPN subnetworks 110-1 and 110-2 of VPN 110 and VPN subnetworks 111-1 and 111-2 of VPN 111 represent network segments. Each network segment is identified by a Virtual LAN ID, or VLAN ID, corresponding to the VPN subnetwork 110 or 111, discussed further below. Each node 113 includes routing information for the respective VPNs and thus, for the end users 114 or 115 that the particular node 112 serves. In the exemplary configuration, the routing information is stored in virtual routing and forwarding tables (VRFs, discussed below) corresponding to each of the VPN networks 110 and 111. By the segmentation operations discussed below, a forwarding device (e.g. node 113) employs a VLAN ID to identify the VRF, and thus the VPN subnetwork associated with 110 or 111, that a particular packet is destined for. Therefore, the VLAN ID identifies the segment, and the router node 113 selects the routing information, stored in a VRF, to route the packet to the destination subnetwork 110 or 111, as appropriate. The configurations discussed further below therefore provide segmentation by encapsulating the message packet with the VLAN ID indicative of routing and forwarding information (i.e. a VRF table) to be employed at the receiving router node 113.

Figure 2:
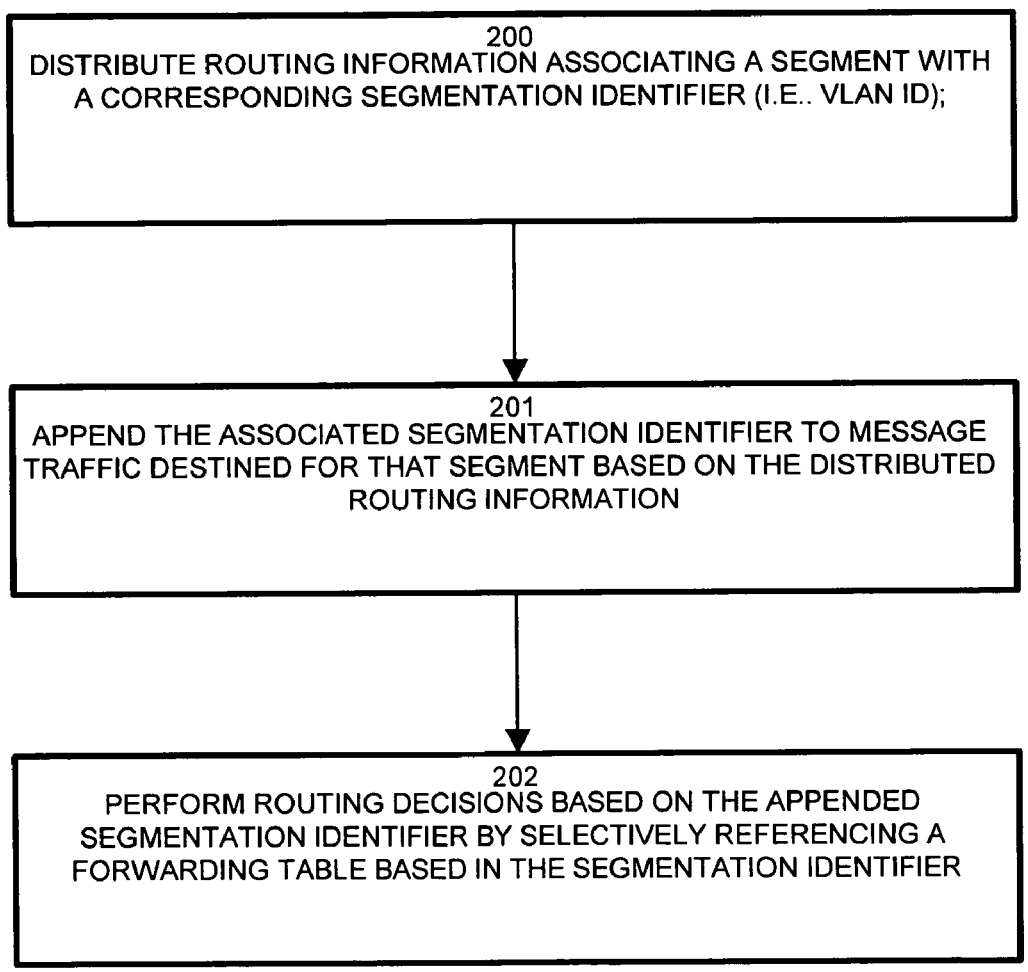
FIG. 2 is a flowchart depicting segmentation as disclosed herein in the network of FIG. 1.
Figure 3:
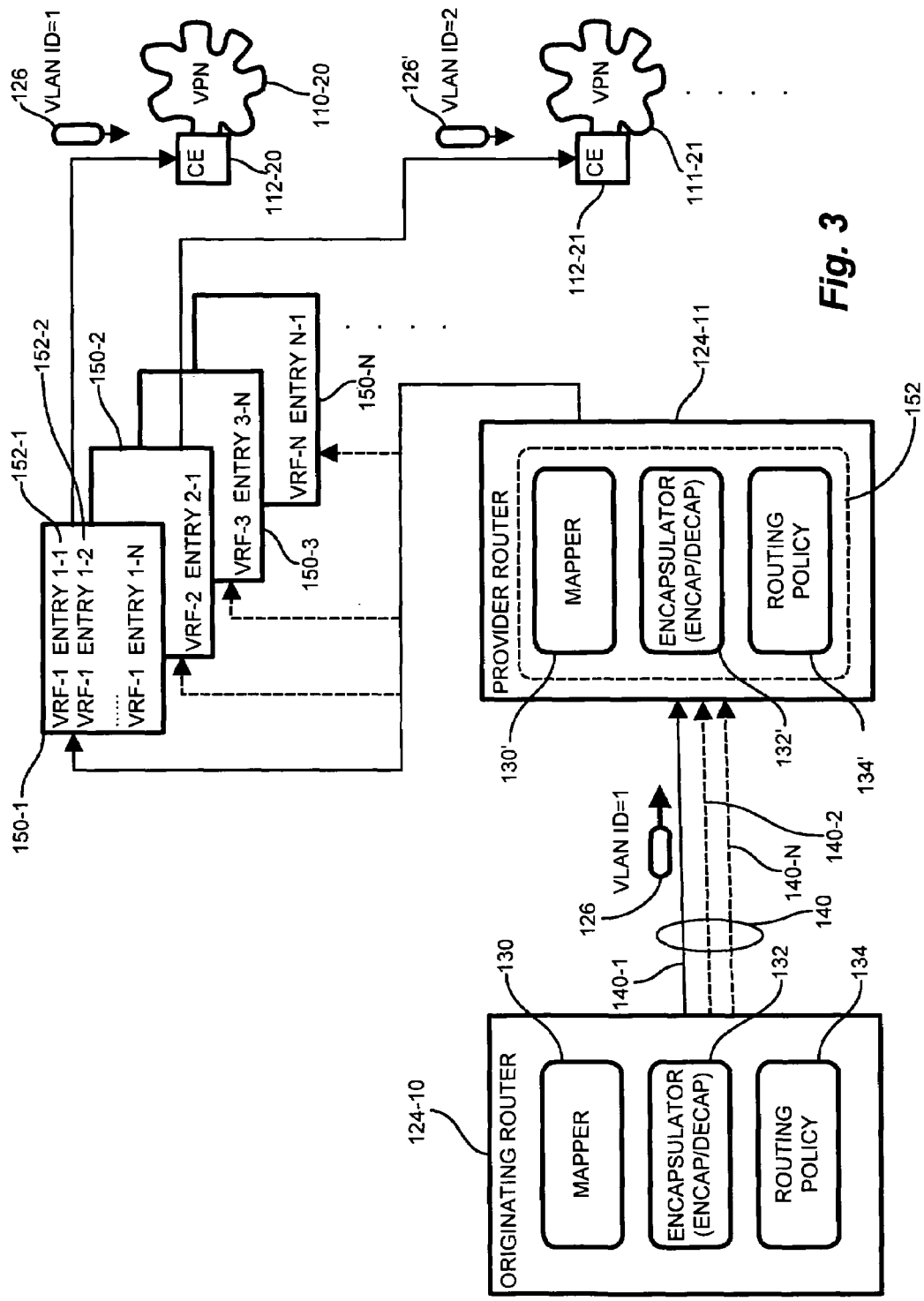
FIG. 3 is a block diagram of a forwarding device (router) in the network of FIG. 1 and operable for segmentation as discussed further below.

FIG. 2 is a flowchart depicting segmentation as disclosed herein in the network of FIG. 1. Referring to FIGS. 1 2, and 3, the mechanism for maintaining network segmentation in a campus networking environment disclosed herein includes, at step 200, distributing routing information from 124-11 associating a VPN segment 110 and 111 with a corresponding VPN-ID segmentation identifier, such as a VLAN ID or other identifier, of a virtual routing and forwarding table (VRF) associated with a group of recipients either identified as 114 or 115. The routing and forwarding information is disseminated, or published, by the nodes 124-11 operable to route to a plurality of other VPN subnetworks 110 and 111. The published VPN-ID, such as a VLAN ID, therefore, indicates which of the plurality of VRFs to employ for each VPN subnetwork 110 or 111.

At step 201, the forwarding router 124-10 append the associated VLAN ID (i.e. segmentation identifier) to message traffic destined for that segment based on the distributed routing information. Therefore, nodes 113 receiving the published routing information encapsulate, or embed, the published VLAN ID in a packet destined for the segment 110 or 111 corresponding to (identified by) that VLAN ID. Upon receiving a forwarded packet, the receiving router 124-11 performs routing decisions based on the appended VLAN ID by selectively referencing a forwarding table based on the VLAN ID, as depicted at step 202. The receiving router 124-11 therefore retrieves the encapsulated VLAN ID (decapsulation), to identify the segment, or destination subnetwork 110 or 111 (and associated VRF 150-1 or 150-2), to which the message packet is destined. The router 124-11 then forwards the message packet to the appropriate CE 112-20 at the destination subnetwork 110-20 or 112-21 at the destination subnetwork 111-21.

FIG. 3 is a block diagram of a forwarding device (router) 113 in the network of FIG. 1 and operable for segmentation as discussed further below according to principles of the invention. Referring to FIGS. 1 and 3, an originating router 124-10 and a destination router 124-11 send and receive message packets 126, respectively. In the exemplary arrangement, the originating router 124-10 and destination router 124-11 (124 generally) are router nodes 113 in the campus environment 100 defining the interconnection 120 between the various VPNs 110 and 111 of FIG. 1. Such routers 124 may be interior or edge routers, however they are operable for VLAN ID based communication within the campus environment 100. Typically, each routing hop along a path between users 114 or 115 (where routing decisions are made) is at a router 124 configured as follows. The routers 124 include a mapper 130-130', an encapsulator 132-132', and a routing policy 134-134. The mapper 130 identifies the VRF table 150-1 . . . 150-4 (150, generally) corresponding to a particular VLAN ID. The encapsulator 132 encapsulates and decapsulates the VLAN ID in the message packet 126 for transport with the packet 126. The routing policy 134-134' determines packet attributes related to transport such as QOS parameters applied to the traffic associated with a particular segment. Each VLAN ID identifies a particular VPN, either 110 or 111, having a corresponding routing table, or VRF 150-N. The packet 126 is transported on the common interface 140-1, and does not need to employ other interfaces 140-N. Based on the VLAN ID, the provider router 124-11 maps the message to a appropriate VRF 150 for making routing decisions. In the exemplary configuration, the forwarding information is a Forwarding Information Buffer (FIB) in the VRF table 150-1, indexed by VLAN ID=1, selectively indexed based on the segmentation information, however alternate arrangements of forwarding data keyed off the encapsulated VLAN ID will be apparent to those of skill in the art. The VRF entries 152-1 . . . 152-N (152 generally) contain routing information specific to the VPN segment where 152-1 is associated with VPN 110 and 152-2 is associated with VPN 111, and are used to route the traffic to the corresponding CE 112. In this manner, the individual routers 124 including the mapper 130, encapsulator 132, and routing policy module 134 perform network segmentation preservation including the following functions: route distribution with segment identification, policy distribution for a given VPN segment, and encapsulation/decapsulation for each segment using Ethernet VLAN_ID.

Figure 4:
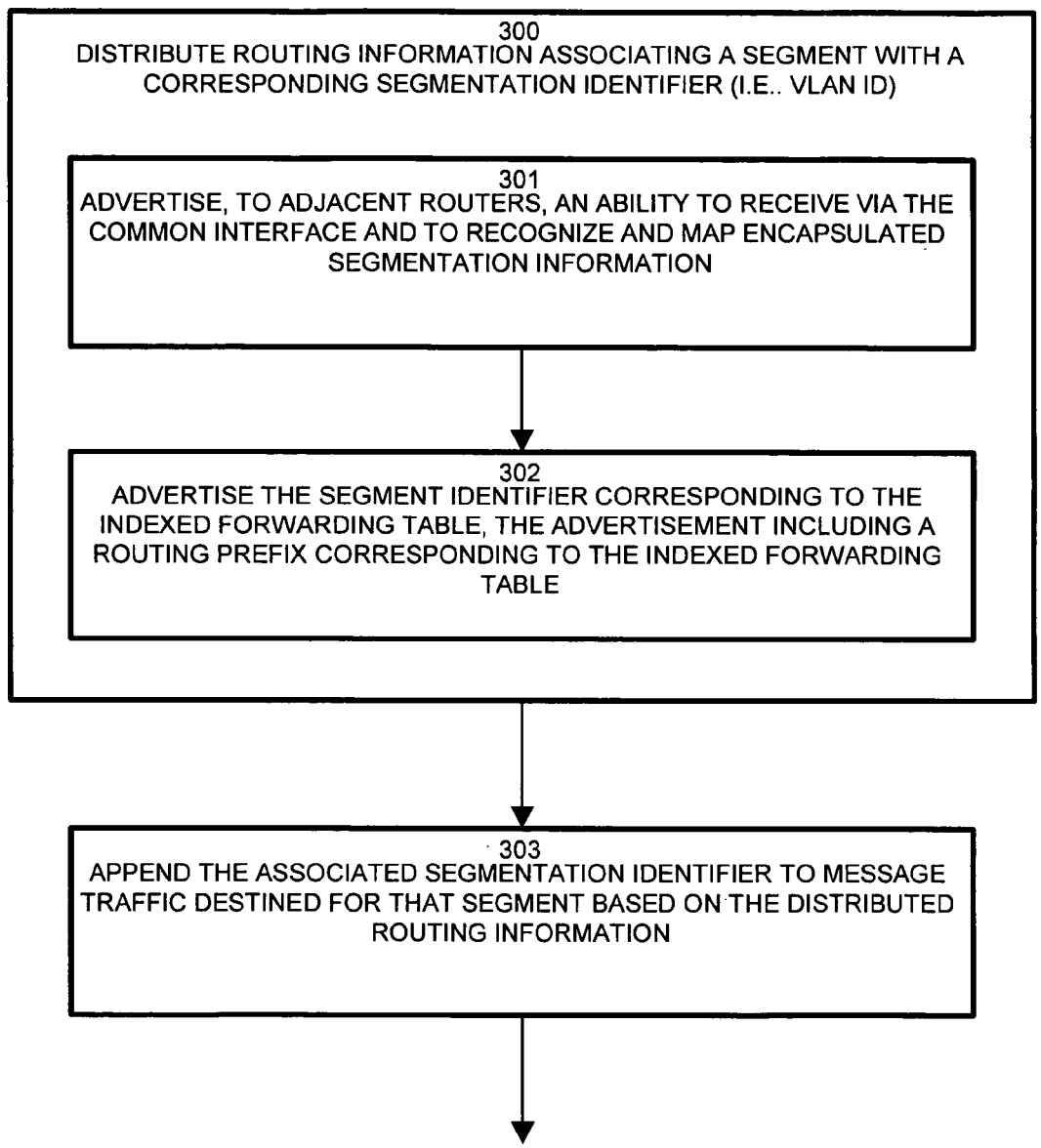
FIGS. 4-6 are a flowchart of processing employing the segmentation mechanism in the forwarding device of FIG. 3.
Figure 5:
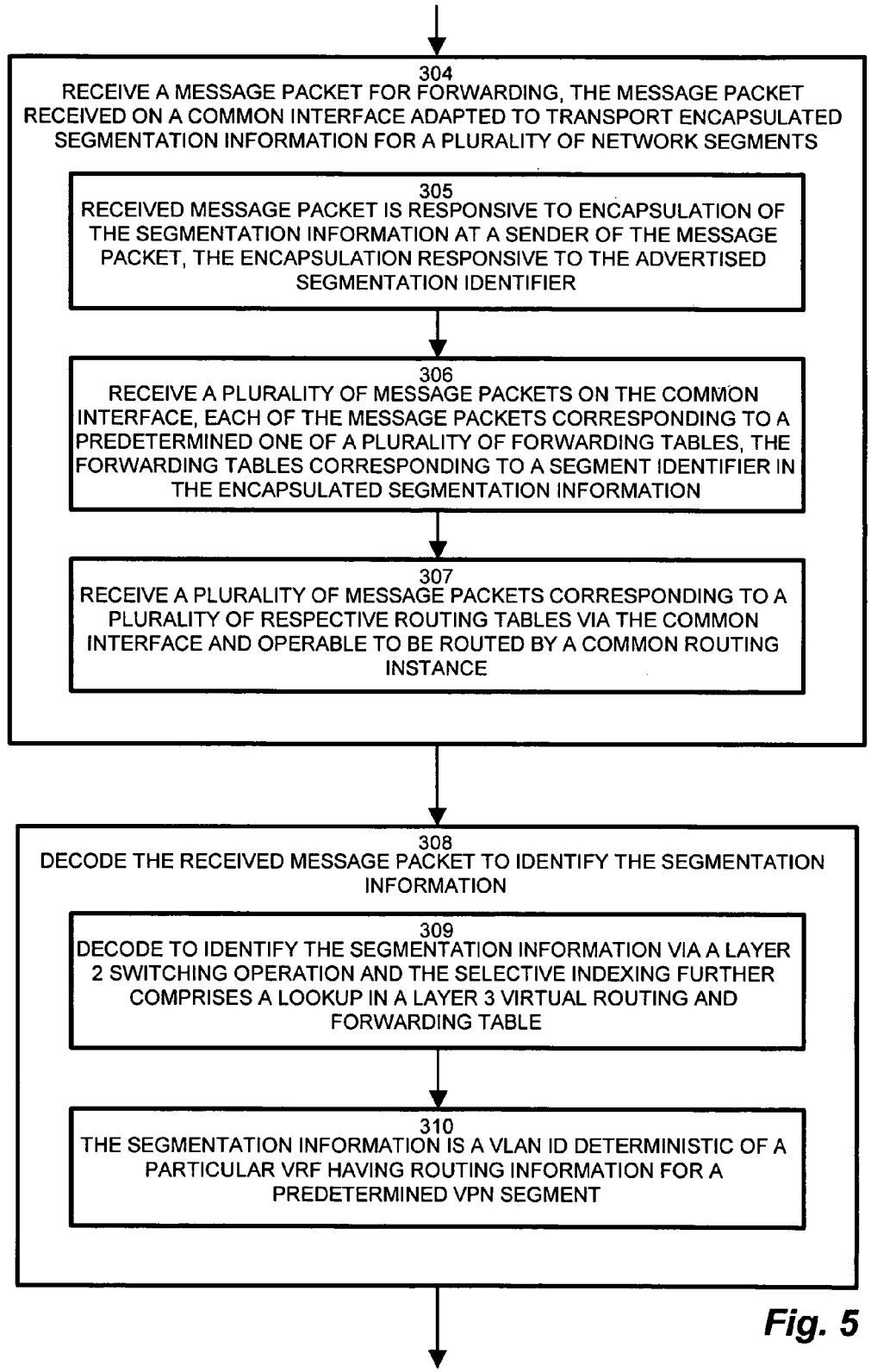
Figure 6:
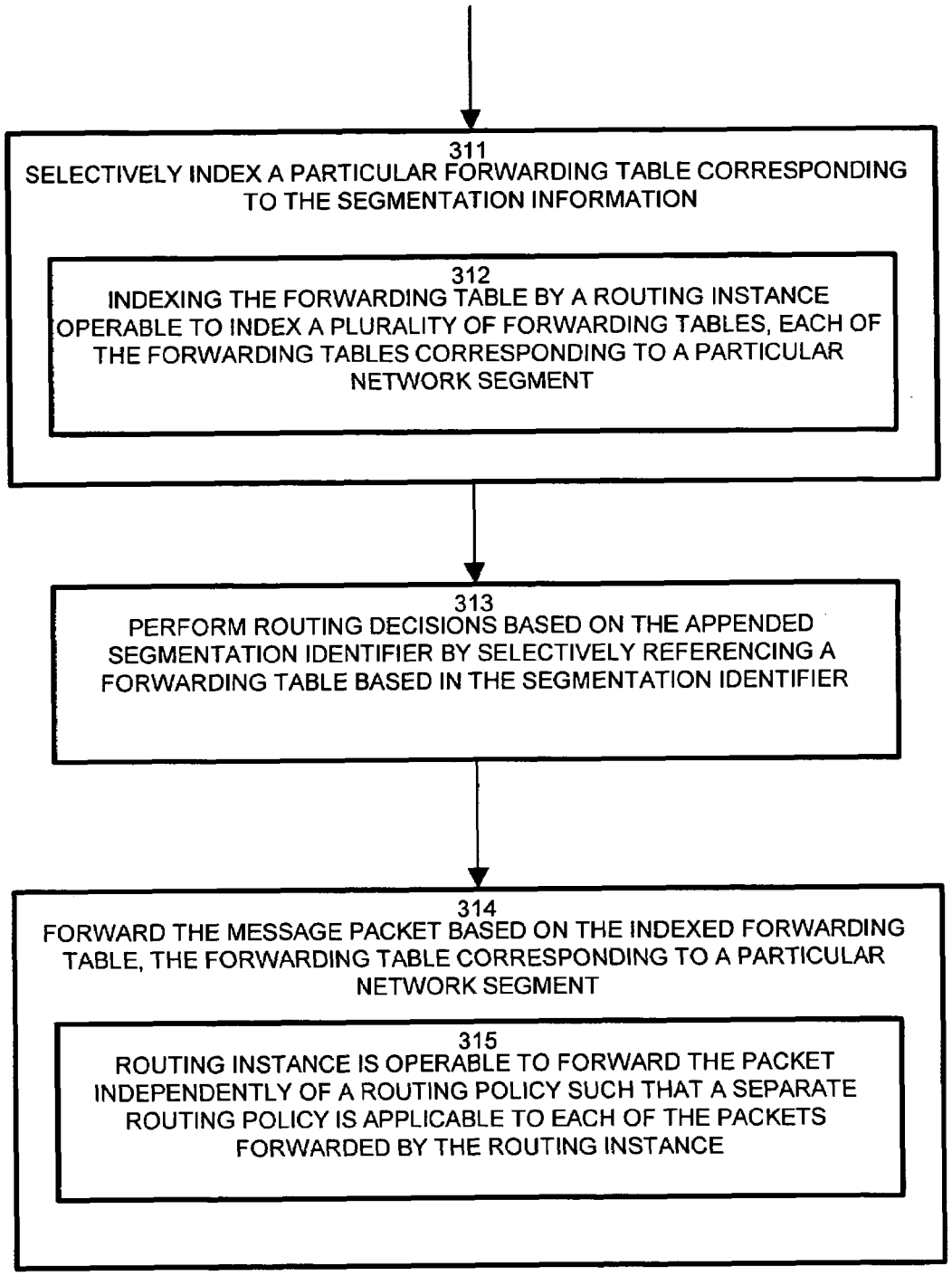

FIGS. 4-6 are a flowchart of processing employing the segmentation mechanism in the forwarding device of FIG. 3. Referring to FIGS. 3-6, in the exemplary campus networking environment, at step 300, campus routers 113 serving the respective segments, or VPN subnetworks 110 and 111, distribute routing information associating a segment with a corresponding segmentation identifier (i.e. VLAN ID) for the segment 110 or 111 that the router 113 is operable to route to. Advertising the routing information includes, at step 301, advertising to adjacent routers 113 an ability to receive via the common interface 140-1 and to recognize and map encapsulated segmentation information. As indicated above, the VLAN IDs are employed with messages 126 over the common interface 140-1 which is independent of the VPN that the message 126 corresponds to. In the exemplary arrangement in FIG. 3, routing information distribution includes advertising the IP prefixes of VRF tables 150 corresponding to each of a plurality of VLAN IDs. This approach avoids the need for a separate interface 140-N setup and teardown for each VPN segment at each router 113 operable to route within that segment. The routing information includes, at step 302, advertising the VPN-ID segment identifier corresponding to the indexed forwarding table, in which the advertisement includes a routing prefix corresponding to the indexed forwarding table 150 referenced by an associated VLAN ID.

Therefore, router nodes 113 in the environment 100 receive the VPN-ID segmentation information as part of the regularly distributed (advertised) routing information that is propagated among adjacent routers 113. A router 113 wishing to send to a particular segment 110 or 111, having received the advertised segmentation information, appends the associated segmentation identifier, or VLAN ID associated with the VPN-ID, to message traffic 126 destined for that segment based on the distributed routing information, as depicted at step 303. For example, in FIG. 3, an ingress router 124-10 wishing to send to VPN segment 110-20 via 124-11, based on VRF-1 150-1, encapsulates a VLAN ID of 1 to the message 126, indicative of VRF-1. Further, another message packet may include a VLAN ID of 2, referencing VRF 150-2, and destined for segment 111-21, shown as message 126' for example, continuing for N segments based on VRFs 150-N. In other words, VLAN ID 1 indicates that table VRF-1 150-1 is to be used for destinations within subnet 110-20, while a VLAN ID 2 indicates that table VRF-2 150-2 is to be used to direct traffic to destinations within subnet 111-21.

The destination router, such as provider router 124-11, receives the message packet 126 for forwarding, such that the message packet is received on the common interface 140-1 adapted to transport encapsulated segmentation information for a plurality of network segments such as 110 and 111, as depicted at step 304. The received message packet 126 is responsive to encapsulation of the segmentation information appended, or encapsulated, at the sender 124-10 of the message packet 126, as depicted at step 305, in which the encapsulation is responsive to the advertised VPN segmentation identifier from step 303. Typically, a network communication includes a sequence of packets 126. Accordingly, at step 306, receiving the message packet 126 further includes receiving a plurality of message packets 126 on the common interface 140, such that each of the message packets corresponds to a predetermined one of a plurality of forwarding tables 150, in which the forwarding tables correspond to a segment identifier (VLAN ID) in the encapsulated segmentation information. Therefore, the VLAN ID is appended, or encapsulated, onto the set of messages that form the communication. Further, many sets of messages, each representing a network communication, or transaction, may be sent. Accordingly, the provider router 124-11 receives a plurality of message packets 126, 126' corresponding to a plurality of respective routing tables 150-N via the common interface 140-1, such that each of the sets of messages directed to a particular VRF 150 is operable to be routed by a common routing instance 152, as disclosed at step 307. Each of the VLAN IDs is independent from the others, and each invokes a corresponding VRF at the receiving router 124-11, and all using the same routing instance 152. This avoids the need to instantiate multiple routing instances 152 for each of a plurality of interfaces 140, as the routing instance 152 handles all VLAN ID denoted traffic from the common interface 140-1.

At step 308, upon receipt of a VLAN encapsulated message packet 126, the receiving router 124-11 decodes the received message packet 126 to identify the segmentation information from the VLAN ID. In the exemplary arrangement, decoding to identify the segmentation information further involves a layer 2 switching operation and the selective indexing further comprises a lookup in a layer 3 virtual routing and forwarding table 150, as disclosed at step 309. The decapsulation approach decapsulates layer 2 segmentation in a message providing a pointer to upper layer protocols (such as layer 3 routing protocols) to identify a VPN segment in the layer 3 network that the packet is associated with. As the packet is routed in layer 3, when it reaches a device that need to again use layer 2 segmentation, the L2 segment identifier associated with the VRF is inserted in the packet header as it is passed back down to the layer 2 processing that sends the packet over the proper layer 2 segment. In this way, VPN segmentation can be sustained over both L2 network devices that do not support the concept of layer 3 segmentation as well as layer 3 routing entities. As indicated above, in the exemplary arrangement shown, the decoded segmentation information is a VLAN ID deterministic of a particular VRF 150 having routing information for a predetermined VPN segment 110 or 111, as disclosed at step 310.

After decoding the VLAN ID, at step 311, the receiving egress router 124-11 selectively indexes a particular forwarding table (VRF) 150 corresponding to the segmentation information (VLAN ID). Such selective indexing into the forwarding table is performed by the single routing instance 152 operable to index a plurality of forwarding tables 150-1 . . . 150-N, such that each of the forwarding tables corresponds to a particular VPN network segment 110-N, as disclosed at step 312.

Following decoding (decapsulating) the VLAN ID to the intended VRF 150, at step 313, the router 124-11 performs routing decisions based on the appended segmentation identifier (i.e. VLAN ID) by selectively referencing a forwarding table 150 based in the segmentation identifier. Typically the routing decisions are made by parsing the routing table 150 for an entry 152-N corresponding to or matching the intended destination. The router 124-11 then forwards the message packet 126 based on the indexed forwarding table entry 152-N, the forwarding table corresponding to a particular network segment 110 or 111, as depicted at step 314. Further, the segmentation routing based on the VLAN ID employs a routing instance that is operable to forward the packet independently of a routing policy such that a separate routing policy is applicable to each of the packets forwarded by the routing instance, as depicted at step 315. Therefore, each of the VRFs 150 maintains a separate routing policy.

Those skilled in the art should readily appreciate that the programs and methods for performing network segmentation as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for performing network segmentation has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of forwarding packets according to a network segmentation mechanism comprising:
   receiving a message packet for forwarding, the message packet received on a common interface adapted to transport encapsulated segmentation information for a plurality of network segments, the message packet being a layer 2 message packet;
   decoding the received message packet to identify the segmentation information, decoding comprising inspecting layer 2 framing information to identify the segmentation information;
   selectively indexing a particular forwarding table corresponding to the encapsulated segmentation information to identify a particular network segment, the particular forwarding table being a layer 3 virtual routing and forwarding table and the particular network segment being a layer 2 network segment; and
   forwarding the message packet based on the indexed forwarding table to the particular network segment, wherein layer 3 segmentation is preserved when forwarded across the layer 2 network segment.

2. The method of claim 1 wherein selectively indexing the forwarding table is performed by a routing instance operable to index a plurality of forwarding tables, each of the forwarding tables corresponding to a particular network segment indicative of a group of user addresses in the indexed forwarding table.

3. The method of claim 2 wherein receiving the message packet further comprises receiving a plurality of message packets on the common interface, each of the message packets corresponding to a predetermined one of a plurality of forwarding tables, the forwarding tables corresponding to a segment identifier in the encapsulated segmentation information.

4. The method of claim 3 further comprising advertising the segment identifier corresponding to the indexed forwarding table, the advertisement including a routing prefix corresponding to the indexed forwarding table.

5. The method of claim 4 wherein the received message packet is responsive to encapsulation of the segmentation information at a sender of the message packet, the encapsulation responsive to the advertised segmentation identifier.

6. The method of claim 1 further comprising receiving a plurality of message packets corresponding to a plurality of respective routing tables via the common interface and operable to be routed by a common routing instance.

7. The method of claim 6 wherein the routing instance is operable to forward the packet independently of a routing policy such that a separate routing policy is applicable to each of the packets forwarded by the routing instance.

8. The method of claim 7 wherein decoding to identify the segmentation information further comprises a layer 2 switching operation and the selective indexing further comprises a lookup in a layer 3 virtual routing and forwarding table.

9. The method of claim 8 wherein the segmentation information is a VLAN ID deterministic of a particular virtual routing and forwarding (VRF) table having routing information for a predetermined VPN subnetwork, the subnetwork being a segmented portion of the VPN.

10. The method of claim 7 further comprising advertising, to adjacent routers, an ability to receive via the common interface and to recognize and map encapsulated segmentation information.

11. The method of claim 1 wherein layer 3 preservation includes route distribution with layer 3 segment identification, policy distribution for a layer 3 segment, and encapsulation/decapsulation for each layer 3 segment using an Ethernet field.

12. The method of claim 11, wherein a policy attribute may include quality of service attribute for a layer 3 segment.

13. A system for maintaining network segmentation in a campus networking environment comprising:
   a plurality of routing entities, each of the routing entities operable to:
      distribute routing information associating a segment with a corresponding segmentation identifier;
      append the associated segmentation identifier to message traffic destined for that segment based on the distributed routing information; and
      perform layer 2 routing decisions based on the appended segmentation identifier by selectively referencing a forwarding table based on the segmentation identifier to identify a layer 2 network segment, the forwarding table being a layer 3 forwarding table.

14. The system of claim 13 wherein the routing entity further includes a routing instance operable to forward the packet according to a routing policy such that a separate routing policy is applicable to each segmentation identifier for the packets forwarded by the routing instance.

15. The system of claim 14 wherein the routing instance is further operable to decode the segmentation information, decoding further comprising a layer 2 switching operation and the selective referencing further comprising a lookup in a layer 3 virtual routing and forwarding table.

16. The system of claim 15 wherein the segmentation information is a VLAN ID deterministic of a particular VRF having routing information for a predetermined VPN segment.

17. A network forwarding device for performing network segmentation comprising:
   a first identifier corresponding to a first network segment;
   a second identifier corresponding to a second network segment;
   an encapsulator operable to encapsulate and decapsulates the first identifier in a message intended for a recipient in the first network segment, the first network segment being a layer 2 network segment;
   a routing instance operable to index, via the encapsulated first identifier, forwarding information indicative of the first network segment;

a forwarding table indicative of routing paths corresponding to particular layer 3 recipients; and a mapper in the routing instance operable to identify, in the forwarding table referenced by the encapsulated first identifier, a next hop for the message in the layer 2 network segment, the first identifier and second identifier respectively indicative of independent forwarding information.

18. The device of claim 17 wherein the encapsulated first and second identifiers are operable to index forwarding information in independent forwarding tables.

19. The device of claim 18 wherein the mapper is operable to selectively index a plurality of forwarding tables, each of the forwarding tables corresponding to a particular network segment indicative of a group of user addresses in a particular indexed forwarding table.

20. The device of claim 19 wherein the routing instance is operable to receive a plurality of message packets on the common interface, each of the message packets corresponding to a predetermined one of a plurality of forwarding tables, the forwarding tables indexed by a subnetwork identifier in the encapsulated segmentation information, the subnetwork being a segmented portion of the VPN.

21. The device of claim 20 wherein the routing instance is operable to advertise the segment identifier corresponding to the indexed forwarding table, the advertisement including a routing prefix corresponding to the indexed forwarding table.

22. A computer program product having a computer readable medium operable to store computer program logic embodied in computer program code encoded thereon for of forwarding packets according to a network segmentation mechanism comprising:

computer program code for receiving a message packet for forwarding, the message packet received on a common interface adapted to transport encapsulated segmentation information for a plurality of network segments, the message packet being a layer 2 message packet;

computer program code for decoding the received message packet to identify the segmentation information;

computer program code for selectively indexing a particular forwarding table corresponding to the segmentation information, the forwarding table being a layer 3 forwarding table;

computer program code for advertising a segment identifier in the segmentation information corresponding to the indexed forwarding table, the advertisement including a routing prefix corresponding to the indexed forwarding table;

computer program code for forwarding the message packet based on the indexed forwarding table, the forwarding table corresponding to a particular network segment; and computer program code for forwarding the packet according to a routing policy such that a separate routing policy is applicable to each segmentation identifier for the packets forwarded by the routing instance.

23. A data communications device for performing network segmentation comprising:

means for distributing routing information associating a segment with a corresponding segmentation identifier;

means for appending the associated segmentation identifier to message traffic destined for that segment based on the distributed routing information;

means for performing layer 2 routing decisions based on the appended segmentation identifier by selectively referencing a forwarding table based on the segmentation identifier to identify a layer 2 network segment, the forwarding table being a layer 3 forwarding table; and means for forwarding the packet according to a routing policy such that a separate routing policy is applicable to each segmentation identifier for the packets forwarded according to the forwarding table.

* * * * *